Dec. 1, 1936.     T. B. PRICKETT     2,062,333
APPLICATION OF HEAT TO CONVERTERS
Filed Oct. 19, 1933
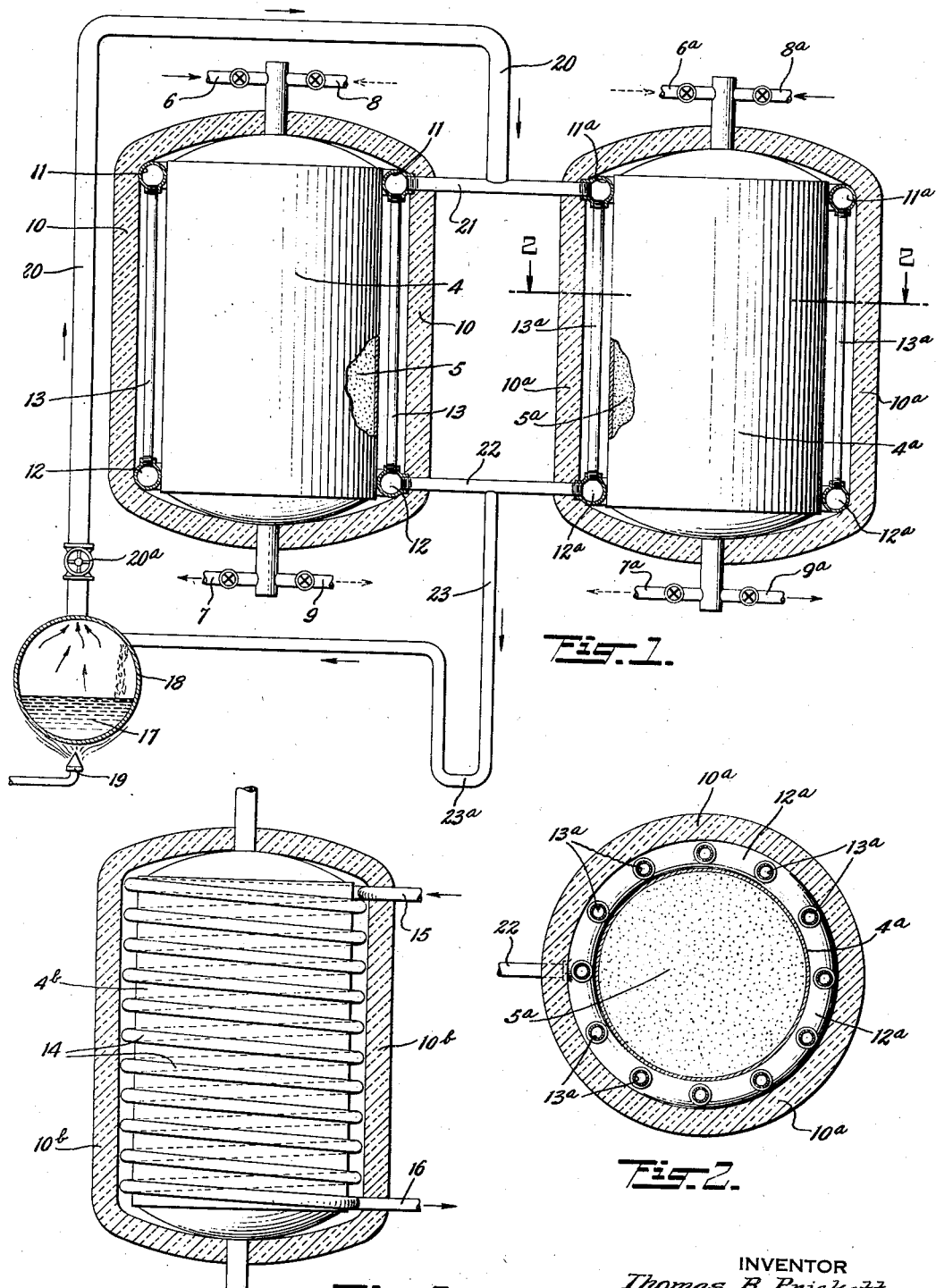
INVENTOR
Thomas B. Prickett.
BY
Ira L. Nickerson
ATTORNEY Patented Dec. 1, 1936

2,062,333

UNITED STATES PATENT OFFICE 2,062,333

APPLICATION OF HEAT TO CONVERTERS

Thomas B. Prickett, Woodbury, N. J., assignor to Houdry Process Corporation, Dover, Del., a corporation of Delaware Application October 19, 1933, Serial No. 694,224

4 Claims. (Cl. 196—119)

This invention relates to the control of the wall temperature of converter casings, especially when the latter contain catalytic or other contact material for promoting or supporting the reactions. It is particularly important when the temperature of the reaction is critical or confined to a narrow range with the heat of reaction supplied or controlled by the fluid entering the reaction chamber. In certain instances it has been found that the use of insulating material or lagging is insufficient for checking loss of heat to the walls of the chamber to such an extent as to prevent interference with the reaction and impairment of the quality or yield of the products.

One object of the invention is to supply heat to the walls of a reaction chamber continuously and at a predetermined temperature. Another object is to apply the heat by a medium whose condensing temperature is suitably controlled as a function of imposed pressure. Other objects will be apparent from the detailed description which follows.

The invention contemplates the use of a fluid heating medium in addition to the insulating or lagging of the converter, the latter being arranged to envelop both the converter and the means by which the heating medium applies heat to the outer walls of the converter. Since accurate control of temperature is essential, the choice of the heating medium is a matter of some importance. By preference, substances are chosen whose condensing temperatures are in the desired range and capable of accurate control as by regulation of pressure in the heating circuit. For the conversion of hydrocarbons, such as mineral oils, by catalytic or other contact masses, mercury and diphenyl are suitable heating substances or mediums. The walls of the converters may be heated individually, or in series when the same temperature is suitable for the walls of all the converters of the series. This series heating is sometimes possible when reactions of differing character, as exothermic or endothermic, are taking place in reaction chambers connected up into the same series.

In order to illustrate the invention and the manner of its use, concrete embodiments are disclosed in the accompanying drawing, in which:

Fig. 1 is a vertical sectional view through the insulating jacket and heating elements of two converters, the latter appearing in elevation, the heating elements being connected in series and the converters being partly cut away to show the contact mass therein;

Fig. 2 is a detail horizontal sectional view of one of the converters shown in Fig. 1, the section being substantially on the line 2—2 of Fig. 1; and Fig. 3 is a vertical sectional view through the insulating jacket of a single converter similar to the converters shown in Fig. 1, but showing a different form of heating element.

Fig. 1 illustrates an arrangement of two converters 4 and 4a, respectively, each containing a contact mass 5 and 5a, the mass being preferably made up of fragments, bits, or molded pieces for regeneration in situ, the two converters being so arranged as to permit continuous operation, with one converter, such as 4, on stream while the other converter, such as 4a, is in regeneration, the two converters alternating in function. For on-stream operation, the material to be converted, modified, or transformed may be admitted by inlet connections 6 and 6a, respectively, while the products leave by outlet conduits 7 and 7a, respectively. To free the contact masses from contaminants deposited during the on-stream operation, cleansing and regenerating fluids may be admitted by inlet connections 8 and 8a, respectively, while the products of the regenerating reaction escape by outlet connections 9 and 9a, respectively.

To assist in maintaining the contact masses at their respective operating temperatures, each converter is enclosed by a thick layer or jacket 10 and 10a, respectively, of heat-insulating material. Between the insulating jacket and the wall of each converter, and arranged at least partly to enclose the converter, are suitable heating means or elements which are arranged to be maintained at a predetermined constant temperature, so as to replace the heat which normally escapes through the outer wall of the converter from the layer of the contact mass immediately adjacent such wall. This layer may be of substantial thickness and is usually at too low a temperature properly to support either the transforming or the regenerating reaction, with the result that the yield and/or the quality of the product is impaired either directly or through failure of this portion of the catalytic mass to be properly regenerated. In the form shown in Figs. 1 and 2, the heating means adjacent the exterior wall of the converters 4 and 4a comprise upper headers 11 and 11a and lower headers 12 and 12a, respectively, which are generally annular in shape and extend entirely around the converters. These headers are connected at suitable intervals by conduits 13 and 13a, disposed in spaced parallel relation, as clearly indicated in Fig. 2. Other forms of heaters may be used as indicated, for example, in Fig. 3, wherein the heater comprises a conduit 14 in the form of a coil which is spiralled about the outer wall of converter casing 4b within insulating jacket 10b, the heater coil 14 having inlet and outlet connections at 15 and 16, respectively.

The purpose of the heaters is to supply heat to the converter walls in an amount sufficient to counteract the normal losses by radiation, conduction, and convection, so that the layer of contact material directly adjacent the wall of the converter will not be reduced in temperature. It has been found that such loss of heat is an important factor in catalytic reactions and, under certain conditions, may run as high as 25% of the heat input into the converter case. The heaters, of course, may also be used, if desired, to provide a part of the heat required by the reaction by maintaining them at a temperature in excess of that needed to supply the normal losses through the converter wall. For accurate control of heater temperature, a substance is selected as the heating medium whose temperature of condensation is within the desired range and can be readily controlled in a number of ways, as, for example, by its vapor pressure in the case of such substances as mercury and diphenyl.

If the temperatures of the operating and regenerating reactions are not too widely separated, two converters may have their wall heaters connected in parallel, as indicated in Fig. 1, so as to be operated at the same temperature. For this purpose, a quantity of mercury or diphenyl, indicated at 17, is disposed in a boiler or other vaporizing member 18, and is vaporized through the action of a heating element 19. The vapors issue from boiler 18 into a conduit 20 having a branched member or manifold 21 which connects with upper headers 11 and 11a of the heaters for converters 4 and 4a. A similar branched member or manifold 22 connects lower headers 12 and 12a to a return conduit 23 which has a return bend 23a forming a liquid seal or trap, the overflow from which drops into the sump 17 of boiler 18. If widely different temperatures are required for the converter wall heaters, each will have a separate boiler with valved outlet and trapped return connections.

The temperature of the heating circuit may be controlled in any suitable or desired manner. One way is to regulate the heat input into vaporizer 18 by heating element 19 (Fig. 1) after making due allowance for line pressure drops between vaporizer 18 and manifold 21. Another way is to provide one or more pressure control valves such as 20a in line 20. Instead of relying upon a difference in liquid level in return 23 to compensate for pressure loss across valve 20a, a sump may be provided at or below manifold 22 with a pump (not shown) used to force the condensate into vaporizer 18.

While the invention is of general application in the control of chemical reactions involving contact masses, a particular use of considerable importance is in the conversion of heavy hydrocarbons into lighter hydrocarbons, as in the catalytic conversion of mineral oils, such as petroleum and its distillates and derivatives, into marketable products, especially low boiling ones such as benzine, gasoline, naphtha, kerosene, etc. For such transformation a contact mass having catalytic activity and comprising molded pieces composed in whole or in part of activated silicate of alumina (such as described and claimed in the copending application of Eugene J. Houdry, Serial No. 600,581, filed March 23, 1932) is particularly suitable. This catalyst produces a good yield of light or low-boiling products from heavier hydrocarbons in the range of 775° to 900° F., depending upon the kind of material under treatment. After the activity of the catalyst has been impaired through the deposit of contaminants thereon, consisting largely of carbonaceous material, it can be completely restored by a regenerating operation which includes the oxidation or burning of the contaminants, preferably at a temperature not greatly in excess of 1000° F., but the contaminants will ignite and burn in the presence of oxygen at 800° F. and lower. Hence, assuming that converter 4 of Fig. 1 is in on-stream or transforming operation at 825° F., and converter 4a is in regeneration at temperatures between 800° and 1050° F., impairment of both operations through undue cooling or chilling of the outer layer of catalyst adjacent the converter wall may be prevented by maintaining heaters 11, 12, 13, and 11a, 12a, 13a at the same temperature, namely in the range of 800° to 850° F., and preferably around 825° F. The following tables give the vapor pressures and corresponding condensing temperatures for both mercury and diphenyl in the useful range for the above described catalytic transformation of hydrocarbons and for other endothermic and exothermic reactions at the same or similar temperatures.

*Mercury*

| Vapor pressure in pounds per square inch absolute | Corresponding temperature of condensation—°F. |
|---|---|
| 30 | 750.9 |
| 40 | 784.8 |
| 45 | 799.3 |
| 50 | 812.5 |
| 60 | 836.1 |
| 70 | 856.6 |
| 100 | 906.9 |

*Diphenyl*

| Vapor pressure in pounds per square inch absolute | Corresponding temperature of condensation—°F. |
|---|---|
| 158 | 750 |
| 188 | 775 |
| 220 | 800 |
| 260 | 825 |
| 290 | 850 |

Hence, to maintain heaters 11, 12, 13, and 11a, 12a, 13a, or 14 at 825° F., the pressure control valve 20a and leg or loop 23a forming the liquid seal would be adjusted, if mercury were used, to maintain an absolute pressure of somewhat below 60 pounds per square inch, while, if diphenyl were used, the vapor pressure to be maintained would be 260 pounds absolute.

I claim as my invention:

1. In combination, a converter for containing a contact mass for effecting endothermic and/or exothermic reactions, a jacket of heat insulating material enveloping said converter, and heating means mounted upon the exterior of said converter interposed between said jacket and the wall of said converter comprising upper and lower annular headers encircling said converter and spaced conduits interconnecting said headers.

2. In combination, a converter for containing a contact mass for effecting endothermic and/or exothermic reactions, a heater mounted upon the exterior of said converter so as to surround a portion of the same, said heater comprising spaced annular headers and conduits interconnecting said headers, means enclosing said heater and said converter to check loss of heat therefrom, vaporizing means for a heating medium, and a valved connection from said vaporizing means to one of said headers of said heater and a trapped connection from the other of said headers to said vaporizing means whereby the heat of condensation of said heating medium may be utilized to maintain said heater at constant temperature.

3. In apparatus for effecting chemical reactions, a plurality of converters, a contact mass in each converter for promoting the desired reaction and capable of regeneration in situ, connections and controls for operating said converters alternately on stream and in regeneration, a layer of heat insulating material enclosing the exterior of each of said converters, a heater surrounding the outer wall of each of said converters and interposed between the latter and said layer of heat insulating material, and means for supplying a heating medium to all of said heaters at substantially the same temperature comprising a circuit which includes said heaters connected in series parallel.

4. In apparatus for effecting chemical reactions, two converters, a contact mass in each converter for promoting the desired reaction and capable of regeneration in situ by oxidation, connections and controls for operating said converters alternately on stream and in regeneration, a layer of heat insulating material enclosing each of said converters, a heat exchanger surrounding the exterior of each of said converters and interposed between the latter and the layer of heat insulating material, each exchanger comprising upper and lower annular headers encircling the converter and a series of conduits connecting said headers, a manifold interconnecting said upper headers of said exchangers, a manifold interconnecting said lower headers, and means connected to said manifolds to form a circuit for a heat exchange fluid whereby the latter is supplied at the same temperature to said exchangers and passes therethrough in parallel.

THOMAS B. PRICKETT.